United States Patent [19]

Holterbosch

[11] 4,375,020
[45] Feb. 22, 1983

[54] OSCILLATING LEVEL INDICATOR

[75] Inventor: Johan L. M. Holterbosch, Bunnik, Netherlands

[73] Assignee: Magnetrol International, Zele, Belgium

[21] Appl. No.: 273,456

[22] Filed: Jun. 15, 1981

Related U.S. Application Data

[63] Continuation of Ser. No. 36,548, May 7, 1979, abandoned.

[30] Foreign Application Priority Data

May 11, 1978 [NL] Netherlands .......................... 7805055

[51] Int. Cl.³ ............................................ H01H 35/00
[52] U.S. Cl. .................................................. 200/61.21
[58] Field of Search ............................ 200/61.2, 61.21; 318/482; 340/615, 617

[56] References Cited

U.S. PATENT DOCUMENTS

| 2,851,553 | 9/1958 | Grostick | 200/61.21 |
|---|---|---|---|
| 3,210,493 | 10/1965 | Lau | 200/61.2 |
| 3,210,495 | 10/1965 | Lau | 200/61.21 |
| 3,290,462 | 12/1966 | Watkins | 200/61.21 |
| 3,721,971 | 3/1973 | Gruber | 200/61.21 |
| 3,975,605 | 8/1976 | van Eeden et al. | 200/61.21 |
| 4,095,064 | 6/1978 | Fleckenstein | 200/61.21 |
| 4,147,906 | 4/1979 | Levine | 200/61.21 |
| 4,211,966 | 7/1980 | Sweet | 200/61.21 |

Primary Examiner—J. R. Scott
Attorney, Agent, or Firm—Wegner, McCord, Wood & Dalton; Wegner, Stellman, McCord et al.

[57] ABSTRACT

There is described a level-indicating device provided with a mounting the device in a wall of a bunker, tank or other container, a system for drive motor mounted to be freely rotatable about the axis thereof, an oscillating transmission unit connected to the drive motor, with an output shaft and a vane mounted on said shaft, whereby the drive motor is provided with switching means to generate a signal and to cut the motor off when the vane meets a resistance. Sealing means are provided for the sealing between the rotatable vane shaft and the mounting. The transmission unit is so designed as to cause a swinging motion of the vane due to the drive motor rotation, while the sealing means comprise a completely closed flexible sealing member which is positively connected on the one side to the vane shaft and on the other side to the mounting.

12 Claims, 12 Drawing Figures

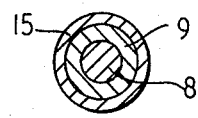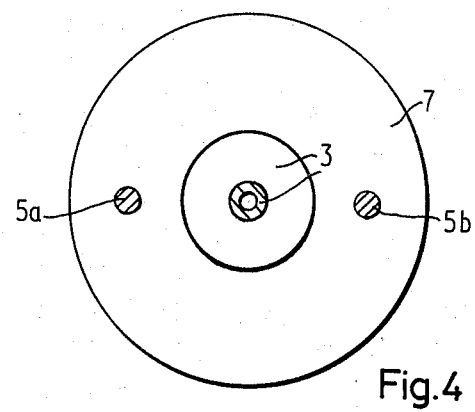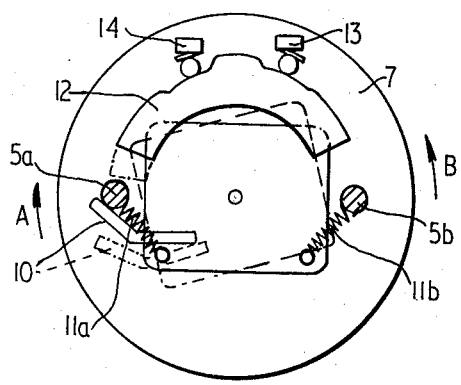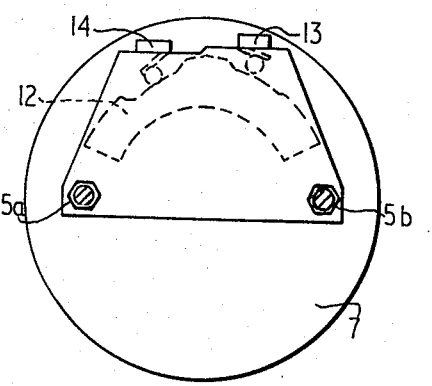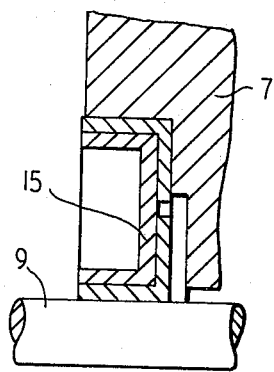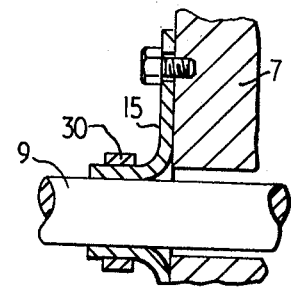

OSCILLATING LEVEL INDICATOR

This is a continuation of application Ser. No. 36,548 filed May 7, 1979 now abandoned.

BACKGROUND OF THE INVENTION

This invention relates to a level-indicating device, provided with a mounting by means of which the device may be mounted in the wall of a bin, tank or other container, a drive motor mounted in said mounting to be freely rotatable about the axis thereof, an oscillating transmission assembly connected to said motor with an output shaft and a vane mounted on said shaft whereby the drive motor is provided with switch means to generate a signal and to cut the motor off when the vane plate meets a resistance.

A known level indicator of the above-defined kind is provided with a continuously-rotating vane, whereby a friction clutch is arranged between the output shaft of the motor and the vane shaft which will slip whenever the vane meets a predetermined too-high resistance. In this arrangement the motor is suspended by springs and rotates within bearings. When the vane meets a resistance, the motor housing will rotate against the spring action and operate the switch means to generate a signal and cut the motor off. As soon as the resistance stops acting on the vane, the motor housing and hence the vane will return under the action of the spring force thereon to the original position whereby the switch means are released and the motor will rotate again together with the vane.

This known device requires due to the continuously-rotating vane, a dynamic seal between the vane shaft and the container frame or wall. Known seals are, for example, oil-return rings, packing bushings, mechanical seals, or some other dynamic seal. If desired, such a seal may be further protected and improved by providing a protecting gas or liquid.

SUMMARY OF THE INVENTION

The invention has for an object an improved level-indicating device of the above-defined kind which requires but little maintenance and is suitable to be used in aggressive media.

To achieve this object it is proposed to design the transmission assembly to cause a swinging motion, i.e. an oscillatory rotating motion, of the vane as the drive motor shaft rotates utilizing a flexible sealing member between the vane shaft and a connecting part fastened to the frame.

By imparting an oscillating motion to the vane, use can be made of a completely closed, or static, flexible seal which is secured to the rotating vane shaft on one side and on the other side constituting a fixed seal relative to the container wall when the indicating device frame is mounted therein. No dust or aggressive liquid can thereby enter the seal, and encrusting cannot occur. Wear of the shaft or seal is thereby prevented, which in turn assures that no change occurs in the moment when a signal is generated. Therefore, a signal is generated exclusively by the liquid or material, the level of which is to be measured. Leakage of aggressive media outside of the container is also effectively prevented.

BRIEF DESCRIPTION OF THE DRAWINGS

Other details and features of the invention will stand out from the description given below by way of non limitative example and with reference to the accompanying drawings, in which:

FIG. 3 is a cross-section along line III—III in FIG. 2.

FIG. 4 is a cross-section along line IV—IV in FIG. 2.

FIG. 5 is a cross-section along line V—V in FIG. 2, showing a cam disc.

FIG. 6 is a cross-section along line VI—VI in FIG. 2.

FIGS. 7 and 8 show variations of the torsion-seal shown in FIGS. 1 and 2.

DESCRIPTION OF THE PREFERRED EMBODIMENTS

Figure 1:
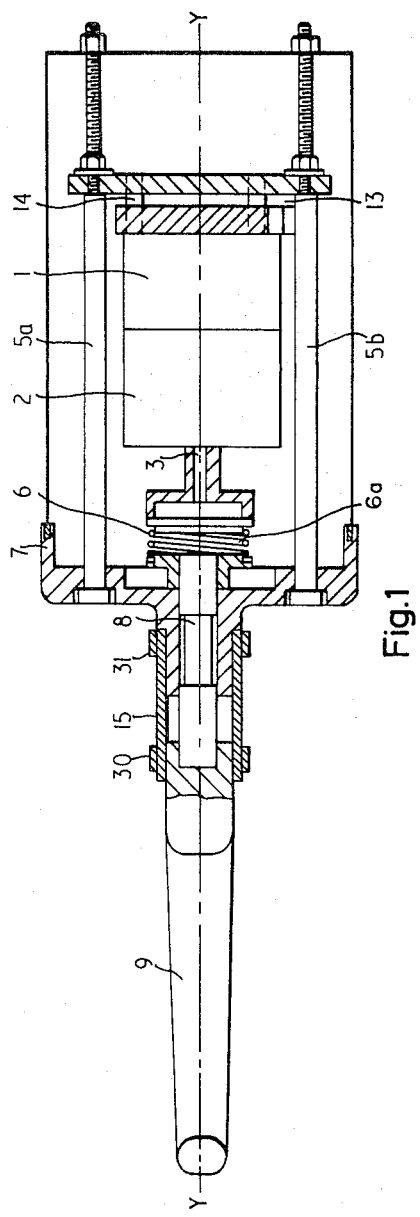
FIG. 1 shows a level-indicating apparatus, partly in vertical cross-section.
Figure 2:
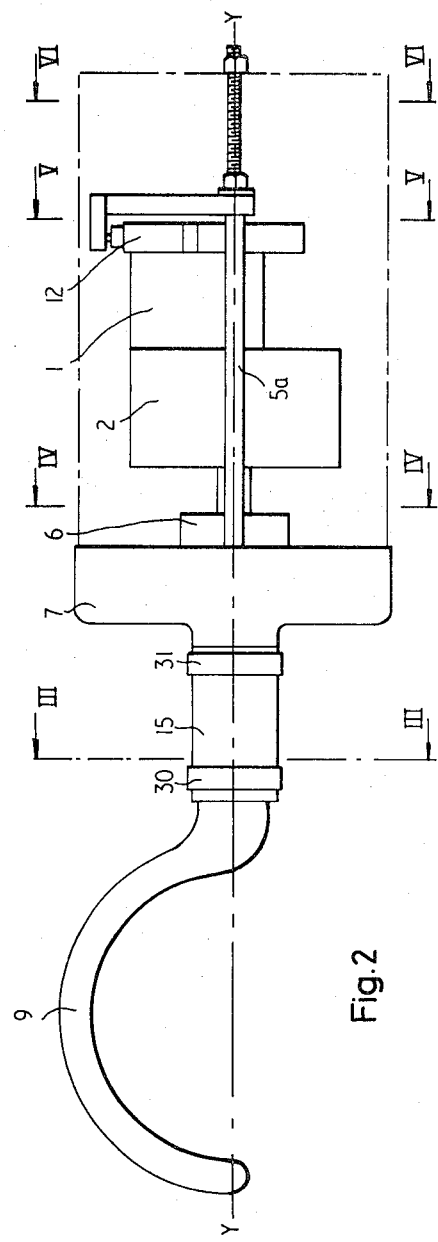
FIG. 2 is a top view partly in cross-section corresponding to FIG. 1.

In FIGS. 1 and 2 is mainly shown a drive motor 1 with an auxiliary drive assembly or transmission 2 flanged thereon. This drive assembly includes reduction gearing operatively connected to the drive motor, which functions to slow-down the revolution speed of the motor. The drive assembly also converts the continuous-rotating movement of an output shaft of the motor into a rocking or oscillating swinging motion. An output shaft 3 of the drive assembly is freely swingable. The motor 1 is connected to rods 5a and 5b which are part of a mounting 7. The motor is supported in the mounting 7 in such a way as to be freely rotatable about its axis Y-Y. The output shaft 3 of the drive assembly is connected through a slip-coupling or friction clutch 6 to a shaft 8 supported by bearings inside a housing of the mounting 7. In the example shown, the housing is made from synthetic material wherein the shaft 8 preferably made of steel may rotate freely. The bearings in this arrangement may be ball-bearings, roller-bearings or slide bearings. A vane or vane plate 9 is secured to the shaft 8. The shape of the vane plate may be adapted to the conditions of each case.

A lever 10 is firmly secured to the motor 1. As shown more particularly in FIG. 5, the lever 10 bears against the mounting rod 5a due to the action of a spring 11a which tries to rotate the freely-rotatable motor with lever 10 in the direction of arrow A. On the opposite side of the motor 1 lies a somewhat weaker spring 11b which attempts to swing the motor 1 in the direction of arrow B. In the normal or rest condition, lever 10 bears however against rod 5a. Under such conditions, due to the transmission 2, the vane will perform an oscillating or swinging motion about its axis over an angle of, for example, 90°. The unit is mounted in the wall of a bin or tank by means of the mounting 7 arranged inside a suitable wall opening. When the contents of the container reaches the level of the vane, the vane meets a resistance. When this resistance exceeds some predetermined value the motor will be urged in a direction opposite to the direction of movement of vane 9. As a result, motor 1 swings together with transmission 2 about axis Y-Y.

As best shown in FIG. 5, a cam disc 12 is mounted on the motor. The cam disc operates in conjunction with switches 13 and 14. When the motor with cam disc 12 starts to swing in the direction of arrow B because said vane meets too high a resistance, the switch 13 will first be operated. The switch 13 is used to generate a signal or energize a relay. Afterwards switch 14 will be operated to cut the motor off.

When the bin contents has afterwards receded so that the vane is released, the motor will swing back under the action of spring 11a, whereby the switches 14 and 13 will be operated again in sequence first to energize the motor again and then to generate a signal or operate a control relay. When the rotating vane meets a resistance during that portion of the swinging movement thereof which corresponds to the direction of arrow B, the motor will attempt to swing in the direction of arrow A. However, this motion is now prevented due to the stop 10 remaining in engagement with rod 5a. In such a case, the slip-coupling 6 will start slipping until the rotation direction of the drive has reversed again, after which the motor will swing in the direction of arrow B and operate switches 13 and 14.

In the present example the slip-coupling 6 is comprised of two halves which grip about an intermediate part consisting of a compressed coiled friction spring 6a which fits with accurately-determined tolerances in the recess of both coupling halves such that a determined controlled friction resistance will appear. During normal rotating the coupling will not slip; but under an overload as above-described, the coupling will slip.

Due to the use of a swinging or rocking movement between predetermined limits about the axis of the vane, it is possible to use a completely-closed, or static, seal between the vane shaft and the mounting 7. As shown in FIGS. 1 and 2, a circular cylindrical bushing 15 is fastened by means of clamping strips 30, 31 respectively to the vane and to a projection of mounting 7. The cylindrical bushing 15 may, for example, be provided with profiles extending locally lengthwise and cross-wise to obtain a higher flexibility for torsion motions. When, due to the pressure inside the container, the sealing bushing 15 is pressed against parts which are movable relative to the bushing, lubricating means may be provided or use may be made of parts with a very low friction, as, for instance, a Teflon coating.

In FIGS. 7 and 8 there are shown variations in the embodiment of the sealing bushing 15. According to FIG. 7, the bushing 15 is designed as a flat cup which has mainly a U-shape in cross-section. Grooves, projections or similar structures may be provided in the surface of the cup to obtain a higher flexibility. FIG. 8 shows a variation of the above structure whereby the fastening to the mounting occurs in a radial plane while the fastening to the shaft is made by means of a cylindrical clamp, whereby the cross-section of the sealing bushing 15 is mainly of L-shape and may be provided with profiles.

Figure 9:
FIG. 9 shows a variation of the embodiment of the cam disc in a motor construction which is swingable to both sides.

In FIG. 9 there is shown an embodiment of the cam disc 12 which is intended for a structure in which the lever 10 does not engage rod 5a but whereby the motor housing is swingable in both directions. With such an embodiment, the motor is retained under the action of springs 11a and 11b in a center position from which the motor may swing to both directions when the vane meets a resistance.

Figure 10:
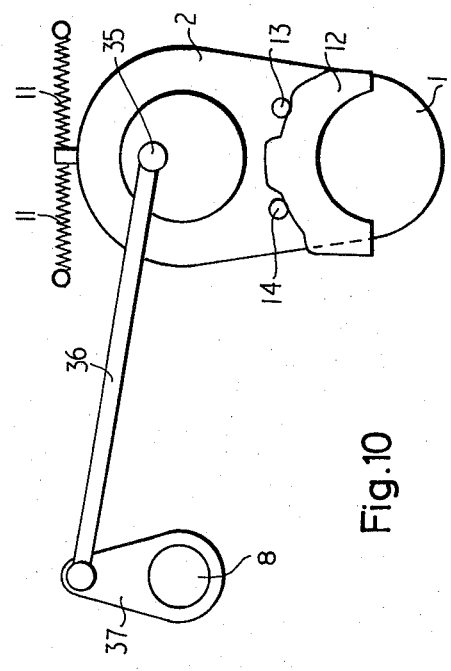
FIG. 10 shows a variation of the structure for the conversion of the rotating movement into a swinging movement.
Figure 12:
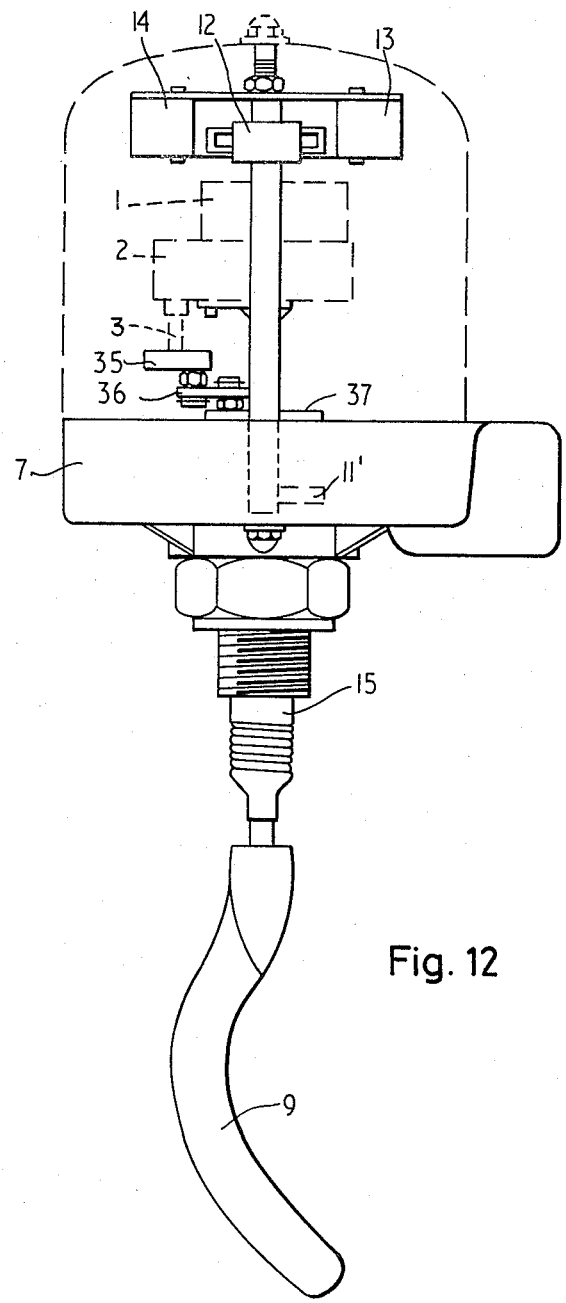
FIG. 12 shows an embodiment incorporating the variations according to FIG. 10.

In the embodiments as shown in FIGS. 1 to 9, the slowing-down of the motor movement as well as the converting thereof into an oscillating motion is performed inside the transmission unit 2. In FIGS. 10 and 12, an embodiment is shown whereby the motor is connected to a reducing drive box which is a part of the transmission 2 and which reduces the speed of the shaft of the motor. The rotating output movement of output shaft 3 of the reducing drive box is conveyed by means of a crank 35 and a connecting rod 36 to a lever 37 which rocks or oscillates the vane 8 as the output shaft of the motor rotates. In the figures the cam disc 12 with the switches, as well as the springs 11 for retaining the motor and transmission in a center position, are shown diagrammatically. In FIG. 12, springs 11 are replaced by a spring blade 11'.

Figure 11:
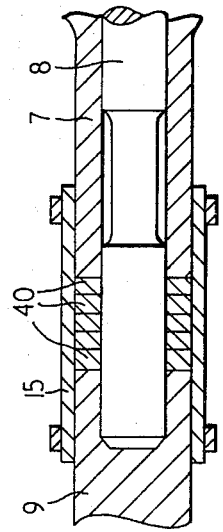
FIG. 11 shows a detail from a variation of the support for the torsion seal.

In FIG. 11 is shown an improved support for the sealing bushing 15. Between the portion of mounting 7 and the shaft of vane 9 lie various rings 40. These rings may easily rotate relative to one another and to the shafts, so that they may move depending on the torsion distortion of bushing 15. If it should be desired to prevent the forces induced by the torsion of sealing bushing 15 from influencing the switching moment of the drive motor, the sealing bushing may be mounted with a prestressing in one direction in such a way that by a motion in the opposite direction at the moment where the switches 13 and 14 are approximately operated, the sealing bushing 15 is substantially devoid of prestressing.

In all of the above-described embodiments, means may be provided to limit the rotation of vane shaft 8 about the geometrical axis thereof. The purpose thereof is to prevent overloading of the torsion sealing bushing 15.

It must be understood that the invention is in no way limited to the above embodiments and that many changes may be brought therein without departing from the scope of the invention as defined by the appended claims.

I claim:

1. In a level-indicating apparatus for detecting the level of material within a container, having a drive motor, a motor drive shaft and a switch positioned adjacent the drive motor, the drive motor being energizable by means of the switch to provide continuous rotating motion to the motor drive shaft, said drive motor being movably mounted in a housing for swinging movement to actuate or deactuate said switch, a vane shaft extending out of said housing, and a vane coupled to said vane shaft and adapted to contact the material in said container to cause said swinging movement of said motor when a predetermined resistance is encountered by the vane, the improvement comprising:

an auxiliary drive means interconnecting the motor drive shaft and the vane shaft to convert said continuous rotating motion of said motor drive shaft into rocking rotative movement, said rocking rotative movement being imparted to said vane shaft to cause movement of said vane in an oscillatory manner about the axis of the vane shaft; and flexible sealing means having first and second ends secured to said vane shaft and to said housing, respectively, so as to be sealed thereagainst and immovable in relation thereto, the flexible sealing means having a central portion capable of torsional flexing in response to the oscillatory movement of the vane shaft and vane.

2. The improvement of claim 1, wherein the flexible sealing means is a cylindrical bushing.

3. The improvement of claim 1, wherein the flexible sealing means is cup-shaped in section.

4. The improvement of claim 1, wherein the flexible sealing means is a bushing of L-shape in section.

5. The improvement of claim 1, wherein the flexible sealing means includes profiles extending lengthwise.

6. The improvement of claim 1, wherein the flexible sealing member is mounted with a prestressing in one direction in such a way that the sealing member exerts substantially no torsion forces when said switch is changed from an actuated to a deactuated state.

7. The improvement of claim 1, wherein the flexible sealing means includes profiles extending crosswise.

8. The improvement of claim 1, wherein the rocking rotative movement of the vane shaft occurs axially of said vane shaft.

9. The improvement of claim 1, in which the auxiliary drive means includes a reduction gear train operatively connected to the motor drive shaft and having a rotatable output shaft, a crank, a connecting rod and a rocking lever connected at one end to the vane shaft and having an opposite distal end, the crank being rotatably connected to the output shaft and the connecting rod being movably joined at its opposite ends to the crank and to the distal end of the rocking lever whereby rotation of the output shaft reciprocates the rocking lever to rock the vane shaft and to oscillate the vane.

10. The improvement of claim 1 in which means are provided to limit oscillation of the vane shaft about its axis.

11. The improvement of claim 1 in which a friction clutch is interposed between the auxiliary drive means and the vane shaft to permit continued movement of the auxiliary drive means when movement of the vane shaft is arrested.

12. The improvement of claim 1 in which the flexible sealing means is a static seal.

* * * * *